(12) United States Patent
Kano

(10) Patent No.: US 7,590,887 B2
(45) Date of Patent: Sep. 15, 2009

(54) MAPPING APPARATUS FOR BACKUP AND RESTORATION OF MULTI-GENERATION RECOVERED SNAPSHOTS

(75) Inventor: Yoshiki Kano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/119,572

(22) Filed: May 13, 2008

(65) Prior Publication Data

US 2008/0215643 A1    Sep. 4, 2008

Related U.S. Application Data

(63) Continuation of application No. 11/654,144, filed on Jan. 16, 2007, now Pat. No. 7,376,865, which is a continuation of application No. 10/664,312, filed on Sep. 16, 2003, now Pat. No. 7,181,646.

(51) Int. Cl.
*G06F 11/00* (2006.01)

(52) U.S. Cl. ................. 714/15; 714/6; 714/20; 714/21

(58) Field of Classification Search ............ 714/6, 714/15, 20, 21
See application file for complete search history.

(56) References Cited

U.S. PATENT DOCUMENTS

| | | | |
|---|---|---|---|
| 6,295,611 B1 | 9/2001 | Connor et al. | |
| 6,397,351 B1 | 5/2002 | Miller et al. | |
| 6,665,815 B1 | 12/2003 | Goldstein et al. | |
| 6,993,761 B1 | 1/2006 | Czajkowski et al. | |
| 7,181,646 B2 * | 2/2007 | Kano | 714/20 |
| 7,376,865 B2 * | 5/2008 | Kano | 714/15 |
| 2004/0260900 A1 | 12/2004 | Burton et al. | |

* cited by examiner

*Primary Examiner*—Joshua A Lohn
(74) *Attorney, Agent, or Firm*—Mattingly & Malur, P.C.

(57) ABSTRACT

Restoration of data is facilitated in the storage system by combining data snapshots made by the storage system itself with data recovered by application programs or operating system programs. This results in snapshots which can incorporate crash recovery features incorporated in application or operating system software in addition to the usual data image provided by the storage subsystem.

6 Claims, 7 Drawing Sheets

| Duration | Process | Owner |
|---|---|---|
| 1 min | Create_snapshot | Administrator |
| 1 hour | Scheduled_backup | Administrator |
| .... | .... | .... |
|  |  |  |

| Name | Snapshot time | Status of data | Application Time | Snapshot ID |
|---|---|---|---|---|
| DB1.dat | 01/23/03 10:10 | Consistent | 01/23/03 10:10 | 1 |
| DB1.dat | 01/23/03 10:11 | Consistent (Recovered) | 01/23/03 10:10 | 2 |
| DB2.dat | 01/23/03 10:12 | Inconsistent (Un-recovered) | - | 3 |
| .... | .... | .... | .... | .... |
| DB1.dat | 01/23/03 10:50 | Confirming | - | 4 |

MAPPING APPARATUS FOR BACKUP AND RESTORATION OF MULTI-GENERATION RECOVERED SNAPSHOTS

CROSS-REFERENCES TO RELATED APPLICATIONS

The application is a continuation of U.S. application Ser. No. 11/654,144 filed Jan. 16, 2007, which is a continuation of U.S. application Ser. No. 10/664,312, filed Sep. 16, 2003, both of which are fully incorporated by reference herein for all purposes.

BACKGROUND OF THE INVENTION

This invention relates to storage systems for storing and backing up of data, and in particular, to a technique for improving the handling and expediting the recovery of snapshot data.

Storage systems for improving data reliability and providing remote back-up copies of data are now well-known and widely used. High performance storage systems can contain enormous amounts of data, which may be quickly accessed in conjunction with many applications. For example, airline reservation systems, financial information systems, and the like can contain large amounts of information accessible to many users. In these systems it is important to not only have the data quickly accessible, but to have highly reliable backup operations enabling relatively fast recoveries from failures. Such systems are designed with redundant hardware, enabling complete remote copies of data in the system.

In an application such as airline reservation system or a financial information system, the lack of availability of the data even for short periods can create substantial difficulties. Many storage systems have a "snapshot" feature that creates copies of the stored information on a periodic basis controllable by a system administrator. Typically the snapshot data is not consistent from the point of view of an application, because the snapshot is not integrated with the application. In fact, the snapshot can be taken at a time when an application program is about to crash or has just crashed, creating unique difficulties in recovering the application data.

One prior art technique for recovering data from a storage system is described in U.S. Pat. No. 6,397,351 entitled, "Method and Apparatus for Rapid Data Restoration . . . ." In this prior art, the last-used data on a primary volume just before the failure can be recovered by combining the backed up data with a log of changes made to the data after the failure occurred. While approaches such as this one are generally satisfactory, they still fail to provide for a circumstance in which an application operating on the host system has its own crash recovery tool which may restore data to that application in an immediate or more efficient manner.

Many such applications, for example, database management systems, have specific crash recovery tools to recover the data for that application when a machine or server fails. Such tools typically only validate the data in the event of a failure. To protect or recover the data back to a certain consistency point, the application sometimes includes the capability of storing the information to maintain the data integrity. Oracle's database management software provides such a capability.

What is needed, then, is a system which enables not only the storage system backup and restore functions to operate, but which integrates any appropriate application's own data integrity management into the overall operation of the storage system.

BRIEF SUMMARY OF THE INVENTION

Many storage subsystems have a snapshot feature that creates a copy of the state of the data on a particular volume or a portion or a volume on a periodic cycle, for example every minute, every hour, etc. In such conventional storage subsystems, the state of the data is often not consistent from the perspective of an application program operating on a host coupled to the storage subsystem because the condition of the snapshot data is not integrated with the application program or the operating system. At the present time, however, there are many operating system features and application programs that have the capability of recovering data being used by that application or operating system program if there is a crash. Such software typically provides a summary of the recovered data after the operation of the application or operating system crash recovery feature. A feature of this invention is its ability to combine the snapshot data indicative of the condition of a volume with the data recovered by the application or operating system software crash recovery features.

A basic configuration for such a system includes a host computer and a storage subsystem. The host and the storage subsystem are coupled by a suitable channel, for example, a fibre channel interface, an Ethernet connection, the internet, etc. The host itself includes management modules for controlling the storage subsystem, a scheduler for creating snapshots, a storage agent for controlling the storage subsystem and the like. The application software, for example conventional office tools or a database system, includes a recovery tool for that application's data and file system.

Using this basic configuration, the scheduler will invoke the operation of creating snapshots in accordance with the predefined schedule. If a failure occurs, the application or operating system software recovery tool recovers the damaged data from the snapshot, and then a manager module inserts the recovered data into its summary of the snapshots. As a result, the snapshot data incorporates any operating system or application software data recovery features.

If restoration of data from snapshots is required, the system administrator accesses the module listing the snapshot data and selects an appropriate snapshot from the summary of snapshots to export to the host.

In one embodiment a storage subsystem adapted to be coupled to a host is provided. The storage subsystem stores snapshot data indicative of a state of data in such storage subsystem at a given time, and stores other data related to an application program or operating system function at the corresponding time. By combining the snapshot and the other data the storage subsystem can be restored to a state indicative of its condition at the given time.

In another embodiment a storage system for storing data is coupled to a computer system having operating system or application software capable of executing a data recovery program, a method for increasing the effectiveness of restoration of data after a failure includes the steps of creating a snapshot of the data stored in a particular storage system, and using the operating system or application system data recovery program, recovering data associated with the computer system to thereby provide a second data image. The first and second images are then combined to provide restored data.

DETAILED DESCRIPTION OF THE INVENTION

Figure 1:
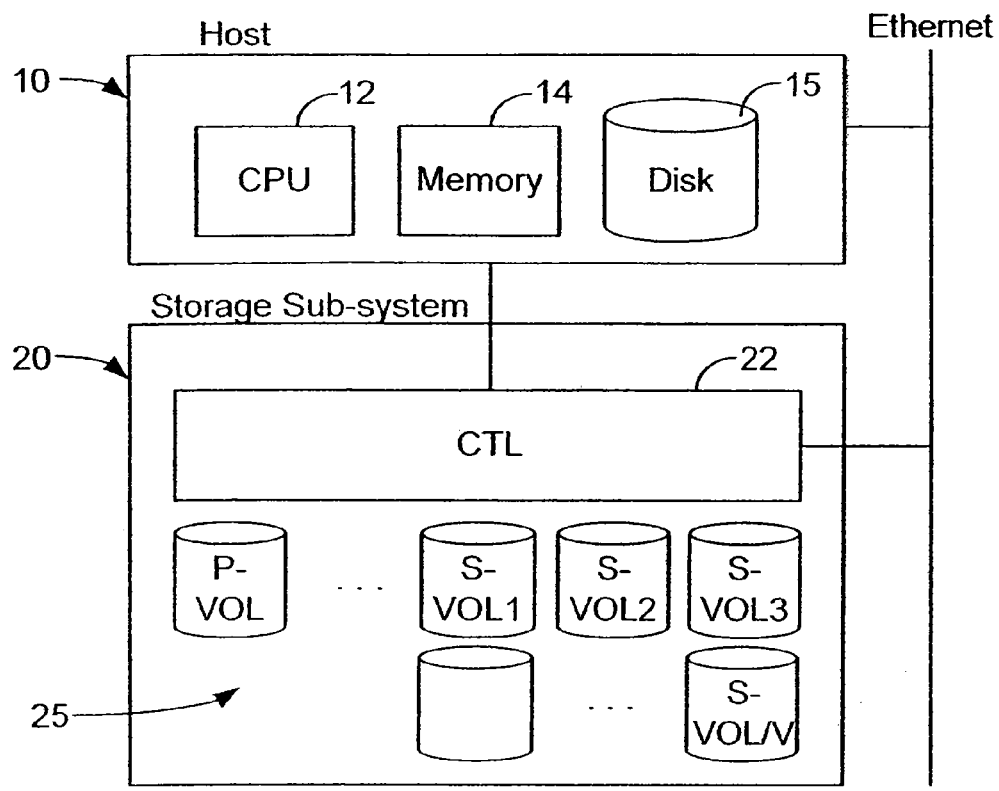
FIG. 1 is a diagram of hardware components and interconnections in a preferred embodiment.

FIG. 1 is a diagram illustrating the hardware components and interconnections among components according to one embodiment of the invention. As shown by the diagram, the system is generally divided into two parts, a host 10 and a storage subsystem 20. Host 10 typically is a commercially available conventional computer system, for example, a server. In the depicted embodiment, host 10 includes a central processing unit (CPU) 12, memory 14, and storage 15. Storage 15 typically will provide storage for an operating system, application software, and storage subsystem management software.

The storage subsystem 20 includes a control processor 22 and a series of storage volumes 25 for storing data. Storage volumes 25 typically are provided by hard disk drives or arrays of hard disk drives, for example, configured as a RAID system. Like the host 10, the control processor 22 typically will include a central processing unit, and preferably includes non-volatile random access memory (NVRAM). The control processor can store data to the NVRAM and protect it, e.g. from a power failure.

Storage volumes 25 are typically arranged as a series of primary and secondary volumes. Typically the primary volumes are used for the storage of data used by the computer system, while the secondary storage volumes often are providing redundant storage to assure higher data reliability. The storage volumes may be configured in a variety of known configurations, for example, RAID 0, RAID 5 or other technology.

In FIG. 1 the host and storage system are illustrated as coupled together using an Ethernet based network. Other well known connections may also be used, for example, fibre channel, SCSI, and iSCSI, token ring, etc. For the control of the storage subsystem, the block input/output operations can be provided over an in-band connection. If the storage subsystem supports a file server such as NFS or CIFS, the controller module may also provide a file server feature to export data stored as a file into the primary and secondary volumes. The hardware shown in FIG. 1 is all conventional and commercially available computer system components.

Figure 2:
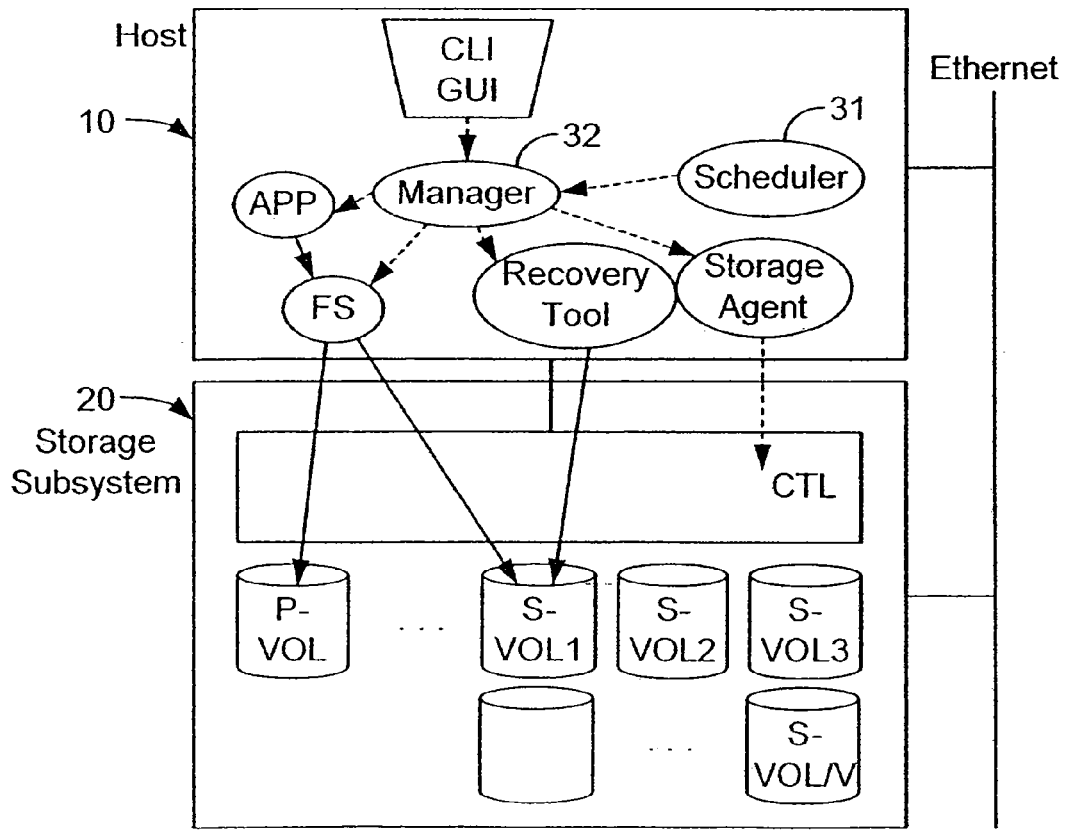
FIG. 2 is a diagram of software components for the implementation of FIG. 1.

FIG. 2 is a diagram illustrating the software components and virtual interconnections among them for the hardware system illustrated in FIG. 1. In FIG. 2, a solid line is used to indicate the direction of data access, while a dashed line indicates the direction of control. As shown in FIG. 2, the host CPU runs application programs (APP), a file system (FS), and a recovery tool for the application data and the file system. In addition, the host may also run a scheduling module, a manager module, and a CLI/GUI interface for management of the overall system. A part of the memory on the host is used for these various modules.

Typically the application and file system components have features like "journal" to recover data whenever the application fails. Such tools are usually provided by the operating system vendor or the application vendor as a technique for enhancing the likelihood of recovery of information that might otherwise be lost when a program crashes. For example, at a file system level, NetApp provides such technology in its Data ONTAP™ products and Veritas also provides it in its Veritas Filesystem™. In addition, the operating system vendor often provides a file system recovery tool similar to "fsck." As example of data recovery tools provided by application vendors see, Oracle's version 9i "Fast Start Checkpointing" or Microsoft's Office Tools document recovery. In the preferred embodiment depicted in FIGS. 1 and 2, these recovery tools are employed to enhance the reliability of data storage and retrieval from the system.

In large storage systems, the taking of "snapshots" is a well-known technique for providing backup information. See, e.g. Hitachi Data Systems *Software Solutions Guide*, page 38. In effect, a snapshot consists of a record of the state of all the data on the volume at a given time. Such a record enables restoration of the storage volume to at least an earlier condition known as of a fixed time. The handling of snapshots for the system depicted in FIG. 2 is the responsibility of the scheduler module. It maintains a schedule for the taking of snapshots, and stores that schedule as a file on the disk 15 in the host (FIG. 1).

Figures 3, 4, 5:
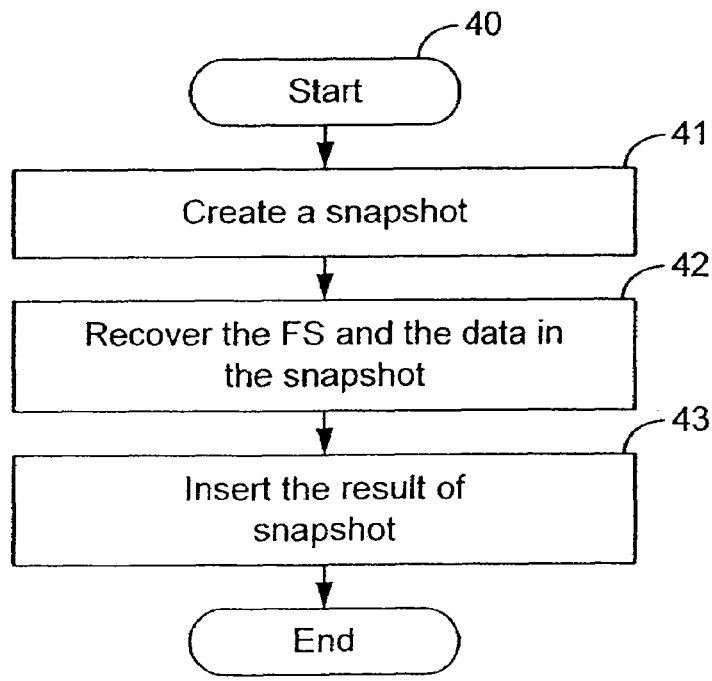
FIG. 3 is an example of a schedule file.
FIG. 4 is an example of a summary of snapshot information.
FIG. 5 is a flow chart illustrating creation of a snapshot.

FIG. 3 is an illustration of such a file for scheduling snapshots. As shown, the file includes a duration, a process, and an owner for each record. In the example depicted in FIG. 3, a snapshot, taken every one minute, is shown as the first line entry, and a backup operation scheduled to occur every hour is shown as the second line entry.

The manager module 32 in FIG. 2 processes two different kinds of events. The first process is the creation of snapshots. This is typically achieved using an applications program interface (API) "create_snapshot" which is invoked by the scheduler module 31. The second process is the restoration of data, for example as requested by the administrator, using a Command Line Interface (CLI) or a graphical user interface (GUI) interface.

FIG. 4 is a chart which illustrates a summary of the snapshots as might be used in conjunction with a restoration operation. As shown in FIG. 4, the summary includes the name of the targeted restored data, the time the snapshot was taken, the status of the data, the restore time from the perspective of an application (referred to as the application time) assuming the application provides a recovery tool. Frequently an additional column is provided, designated snapshot ID, to identify a snapshot from among several different snapshots on the storage system. The fields for the summary of snapshots are name to provide a name for the snapshot, application time to indicate when the snapshot was taken from the point of view of the application, an arbitrary snapshot id, and a field designated "status of data." This last field is explained below.

For the particular application of restoration of data, as described here in the preferred embodiment, there are two main parts. The first part is the creation of the snapshot, as invoked by the scheduler module 31 by calling the appropriate API (create_snapshot). The second part is the restore operation itself, typically triggered by the administrator wishing to restore data from a selected snapshot.

FIG. 5 is a flow chart illustrating the creation of the snapshot. After the process starts at step 40, the snapshot is taken under control of the manager module 32 in the host 10 (FIG. 1). This is shown in step 41 in FIG. 5. In step 42 the file system and the data in the snapshot are recovered. This is typically performed by the manager module 32 requesting a recovery tool to make a consistent state for the file system and the applications data. For the file system, a typical recovery tool is fsck, while for the application, the tool is typically one provided by the vendor of the application.

If the system employs primary and secondary volumes in a file system level, for example as in an NFS server or a CIFS server, then the recovery tool will execute the application's recovery tool. On the other hand, if the implementation uses these in block level, then the recovery tool will execute the file system's fsck and the application's recovery tool. During the recovery the manager module inserts into the snapshot summary table of FIG. 4, under the heading status of data, a status of "confirming."

As shown in FIG. 5, the next step is to insert the result of the snapshot. This result will be "recovered" if the recovery is successful. If successful, the manager inserts the result into the status of data field as "consistent (recovered)". On the other hand, if the recovery fails, then the result will be "inconsistent (un-recovered)" (see line 3 of FIG. 4).

Figure 6:
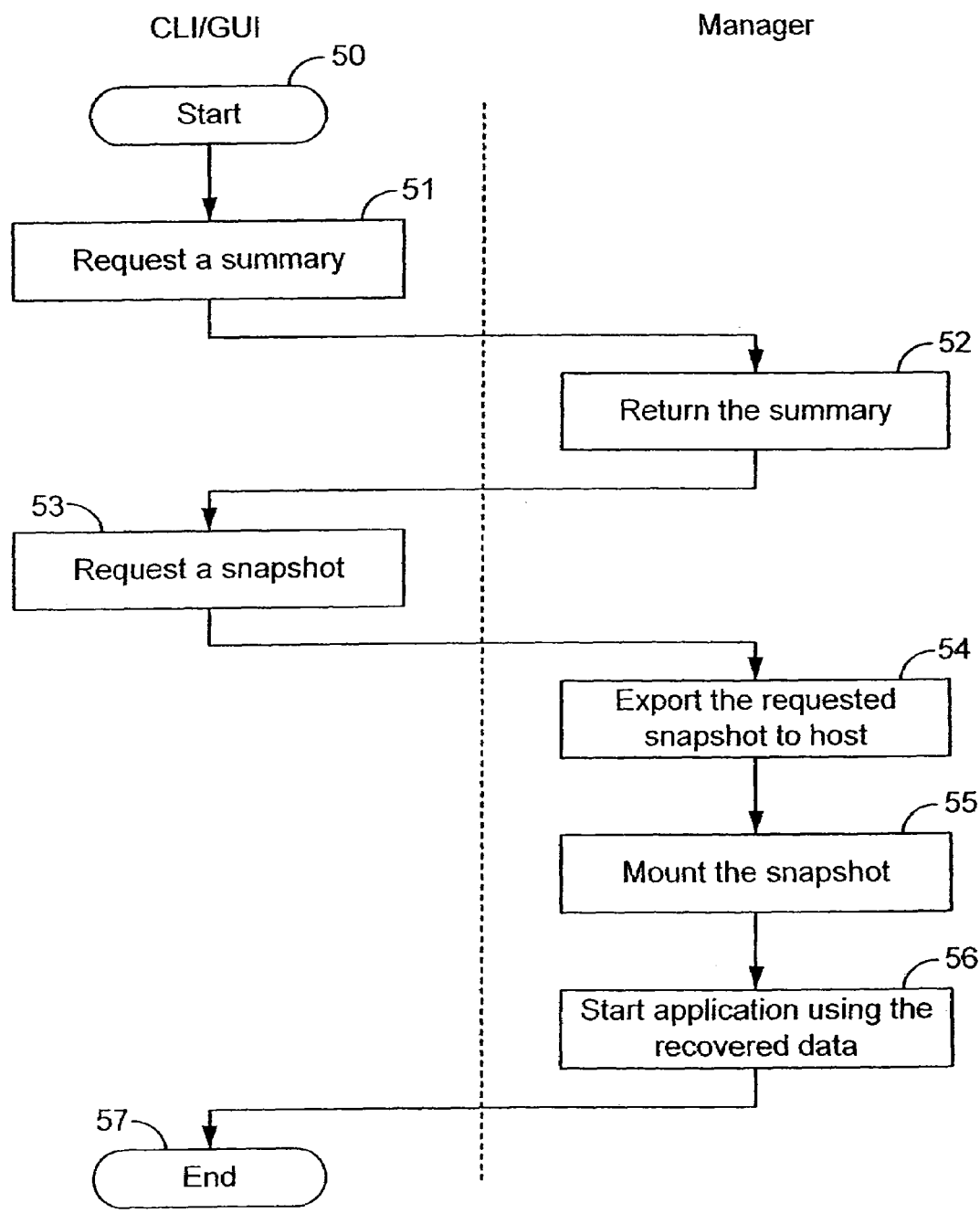
FIG. 6 is a flow chart illustrating a restore operation.

FIG. 6 is a diagram illustrating operations relating to the restore process. The restore operation provides the data selected by the administrator from a summary of the consistent snapshots. As shown in FIG. 6, the flow chart begins with step 50 and proceeds to request a summary of snapshots at step 51. In response, the manager module returns the summary 52 shown in FIG. 4. A snapshot 53 is then requested.

As shown by step 54, the requested snapshot is then exported to the host. At step 55, the snapshot is mounted onto the host, then at step 56, assuming the administrator has so requested, the manager module begins to run the application using the recovered data. As a result of the operation and the interface, the administrator is able to distinguish which snapshots are consistent and which are not. This enables easier access to the snapshot and restoration.

Figure 7:
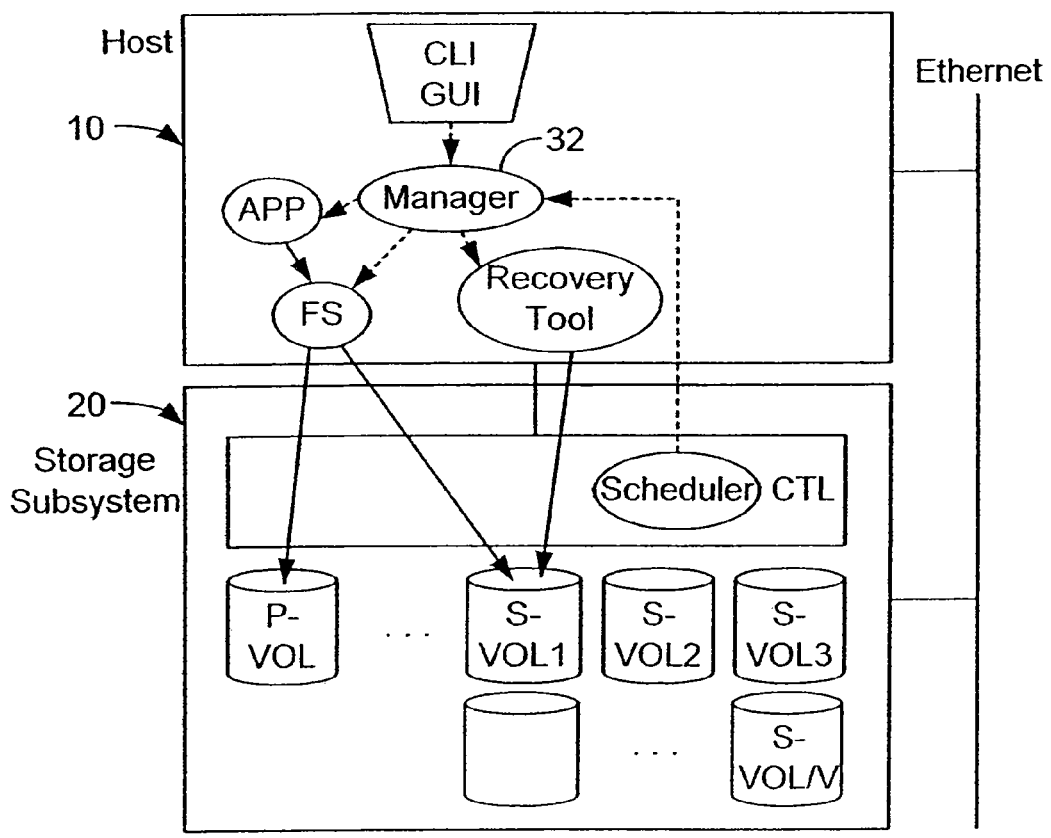
FIG. 7 illustrates an arrangement of software components in another implementation of the invention.

FIG. 7 is a diagram of an alternate implementation for the software components previously shown in FIG. 2. Note that in FIG. 7, the scheduler module, rather than being located in the host, is located in the storage subsystem control processor. In this implementation the scheduler is able to execute creation of a snapshot by itself. Furthermore, the schedule file (corresponding to FIG. 3) will now also be located in the control module in the storage subsystem.

Figure 8:
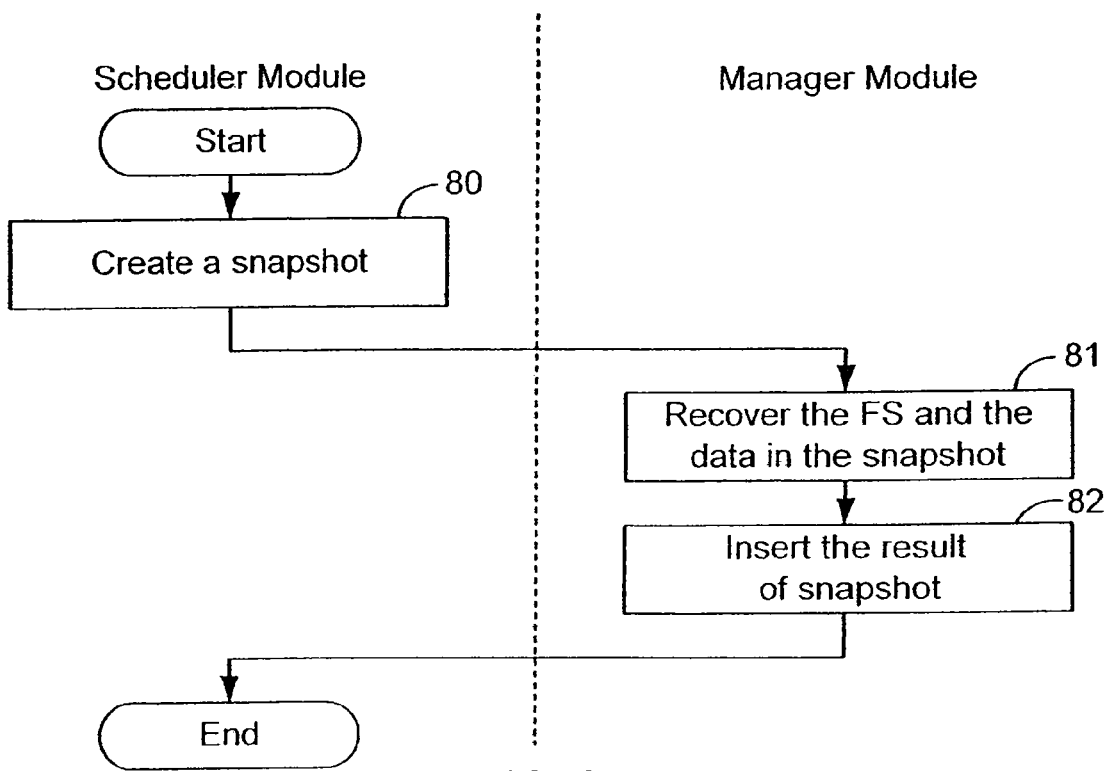
FIG. 8 is a flow chart illustrating creation of a snapshot for the implementation of FIG. 7.

FIG. 8 is a diagram illustrating the creation of a snapshot in the implementation depicted in FIG. 7. As shown in FIG. 8, the snapshot is created at step 80 by use of the macrocode of the controller. Next, the file system and data in the snapshot are recovered as shown by step 81. The recovery tool for the file system is the fsck operation, while the recovery tool for the application is the tool provided by the application vendor. If primary and secondary volumes are employed, for example in the manner of an NFS server or a CIFS server, then the recovery tool for the file system will execute a recovery tool for the application. On the other hand, they can be executed separately and controlled separately. As discussed above, during the recovery operation, the manager module will insert the status "confirming" into the summary.

At step 82, the results of the snapshot are inserted. This is accomplished by the manager module inserting the results of the recovery. If the recovery failed, the manager inserts the result "inconsistent (un-recovered)." If the operation is successful, then the manager inserts the result as "consistent (recovered)."

Figure 9:
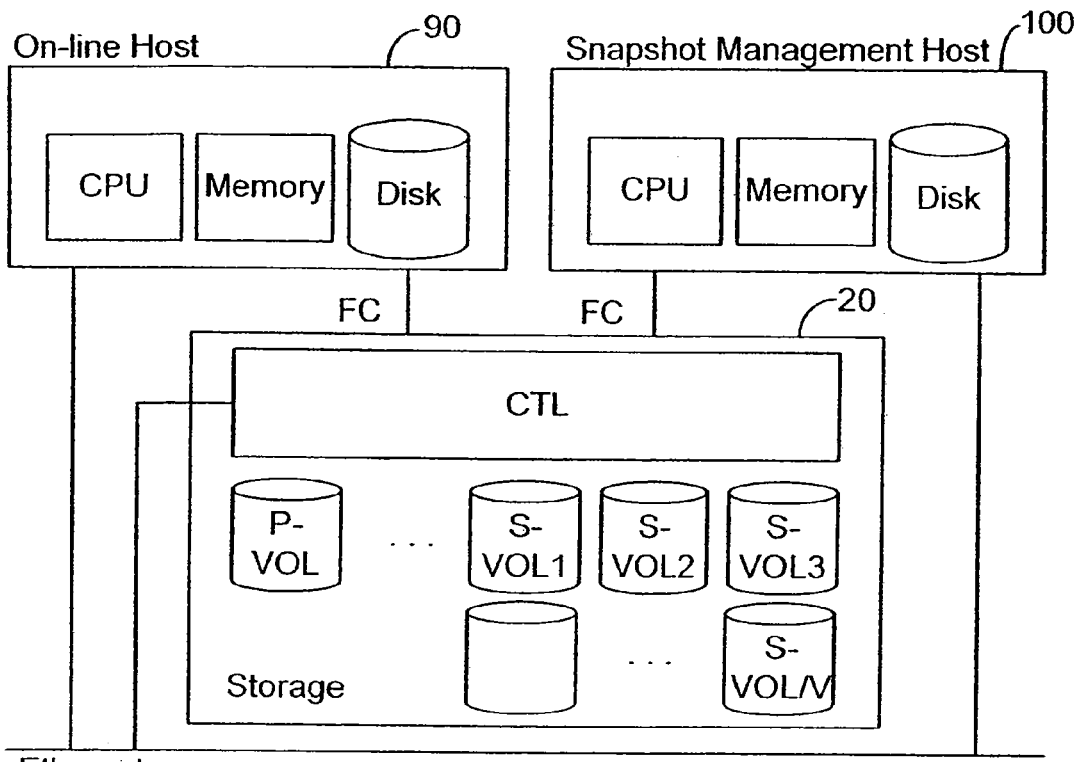
FIG. 9 is a diagram of hardware components and interconnections in a further embodiment of the invention.

FIG. 9 is a diagram illustrating a different hardware configuration than in FIG. 1. In this implementation, the recovery module of the application after the creation of a snapshot is changed. The components shown in FIG. 9 are generally similar to those shown in FIG. 1, however, two hosts are now provided—an on-line host 90 and a snapshot management host 100. Storage subsystem 20 remains the same as that described in conjunction with FIG. 1. There are, however, two channel interfaces provided to the storage system designated "FC." Each of the two hosts 90 and 100 can see and share volumes on the storage subsystem 20. If necessary, the storage subsystem 20 may be enabled to control access to its volumes from the host when the administrator assigns a worldwide name (WWN) that is a unique number for the host bus adaptor. This capability is often referred to as Logical Unit Number (LUN) mapping. Additional communications among the hosts and storage subsystem are provided an Ethernet connection, however, other well-known interfaces may also be employed.

Figure 10:
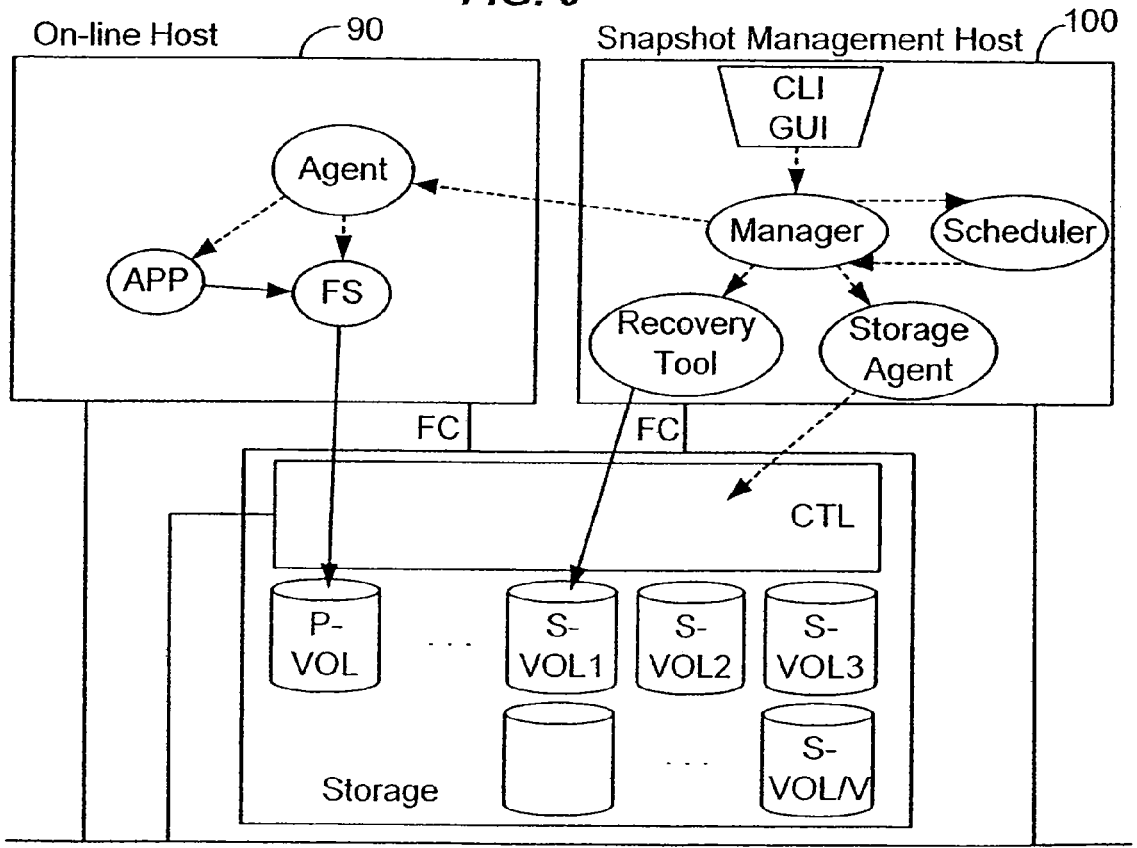
FIG. 10 is a diagram illustrating software components and relationships for such an embodiment.

FIG. 10 is a diagram illustrating the software components for the hardware implementation of FIG. 9. As shown in the upper portion of the figure, a significant difference between the arrangement shown in FIG. 10 and that depicted in FIG. 2 is that the functionality is separated between the two hosts, depending upon the particular task involved. In FIG. 10, the online host includes the file system (FS), the application server portion, and an agent. The snapshot management host includes the remaining components from FIG. 2. The online host 90 runs the application and file system, while the snapshot management host performs snapshot management based on the defined schedule, and maintains data recovery tools as installed. Each of the modules shown in FIG. 10 operates in the same manner as previously described above. Because the manager module cannot control the application and file system operations directly, an agent is inserted into the online host to provide capability of controlling the application startup and shutdown.

Figure 11:
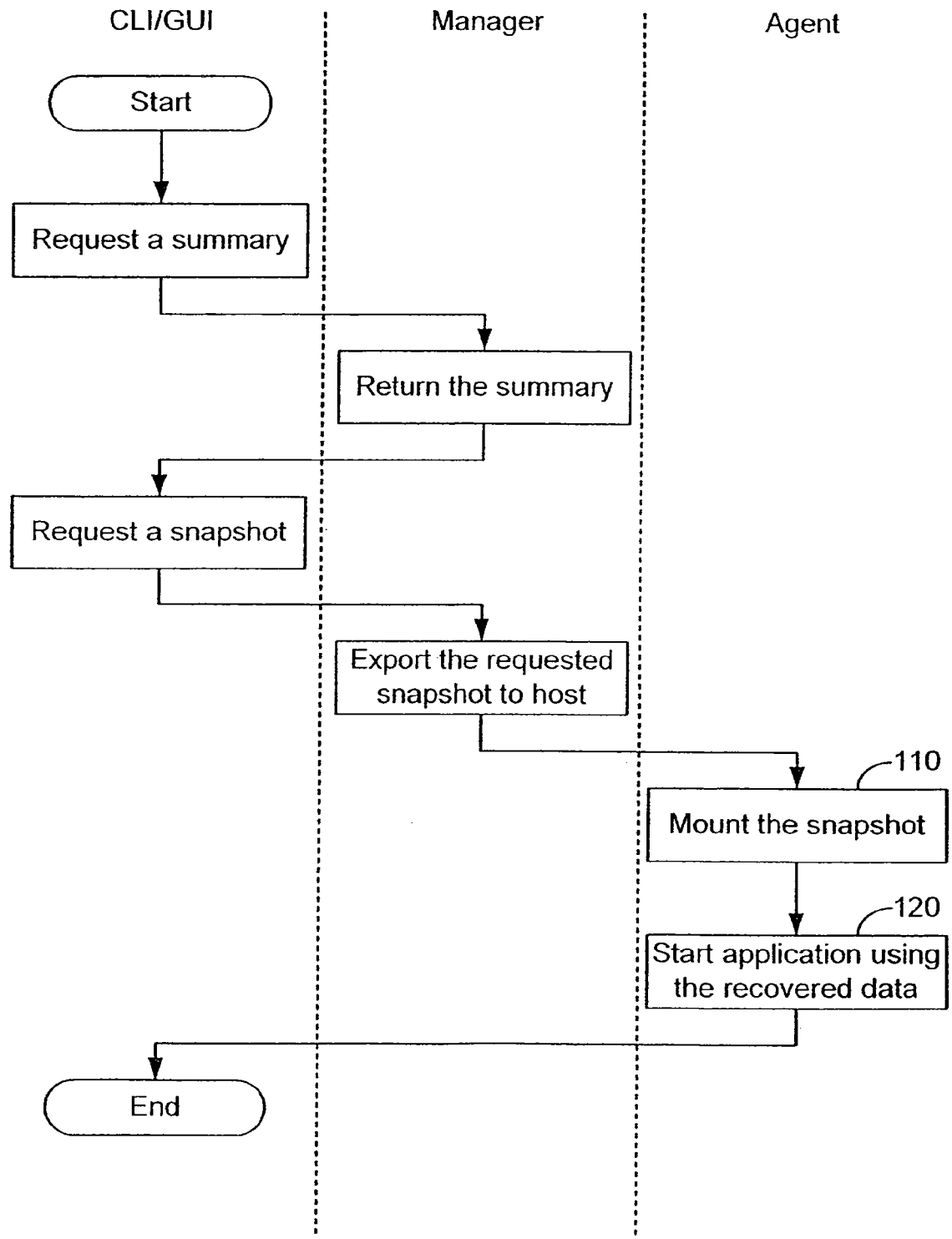
FIG. 11 is a flowchart illustrating a restore operation in this implementation.

FIG. 11 is a diagram illustrating the operational sequence for the module shown in FIG. 10. As shown in FIG. 11, the steps of mount the snapshot 110 and start the application using the recovered data 120 have been moved to the agent. All other steps are carried out in the same manner as with respect to FIG. 6.

Figure 12:
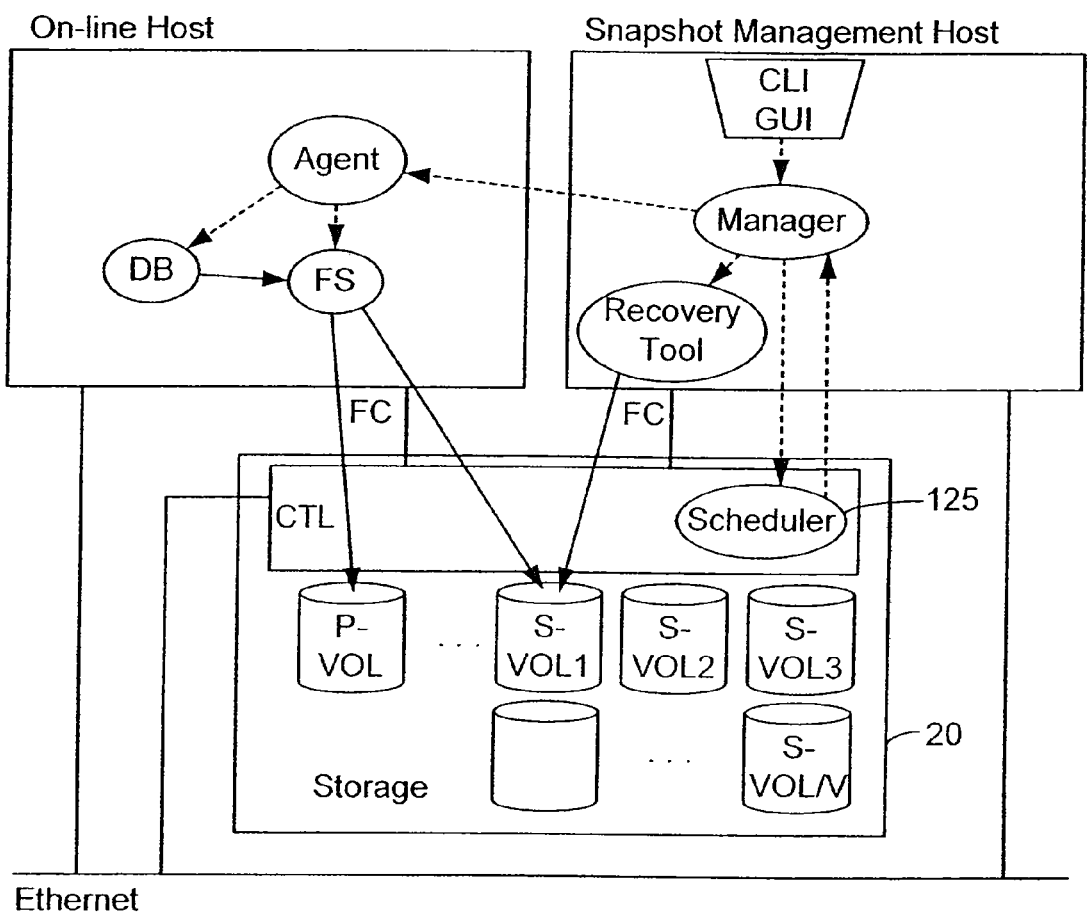
FIG. 12 is a diagram illustrating software components and relationships in a further embodiment of the invention.

FIG. 12 is a diagram illustrating another implementation of the invention in which the scheduler 125 is implemented in the control processor of the storage subsystem 20, in the same manner as shown in FIG. 7. This enables the scheduler to execute the snapshot by itself from within the control processor in the storage subsystem 20.

The foregoing has been a description of the preferred embodiments of the invention. It will be appreciated that various modifications may be made to the implementation of the invention without departing from its scope, as defined by the following claims.

What is claimed is:

1. An information processing system comprising:
   a computer having an application program capable of executing a data recovery program; and
   a storage system, coupled to the computer, which receives a write request from the computer,
   wherein the storage system comprises:
   a storage controller processing the write request from the computer;
   a first storage volume, coupled to the storage controller, which stores data related to the write request from the computer; and a second storage volume, coupled to the storage controller, which stores a snapshot of the first storage volume at a point in time, wherein the information processing system performs data recovery operation of the first storage volume by using the data recovery program and the snapshot, wherein the information processing system stores state of data related to the application program at the corresponding time of the snapshot, wherein the computer includes a file system, and wherein said state of data has information on whether the data related to the application program at the corresponding time of the snapshot is consistent with the file system or not.

2. The information processing system of claim 1, wherein the information processing system designates the snapshot as being a consistent snapshot when a result of the data recovery operation indicates a successful recovery and the snapshot as being an inconsistent snapshot when the result of data recovery operation indicates an unsuccessful recovery.

3. The information processing system of claim 2, wherein the information processing system presents a user with information of the snapshot including whether the snapshot is consistent or inconsistent in response to a request from the user.

4. The information processing system of claim 1, wherein the snapshot is created under control of the computer.

5. The information processing system of claim 1, wherein the snapshot is created under control of the storage system.

6. The information processing system of claim 1, wherein the application software manages journal information for the data recovery operation.

* * * * *